April 14, 1970          D. N. YATES          3,505,750
APPARATUS FOR CREATING APPEARANCE OF OBJECTS IN MOTION
Filed Aug. 28, 1967          5 Sheets-Sheet 1
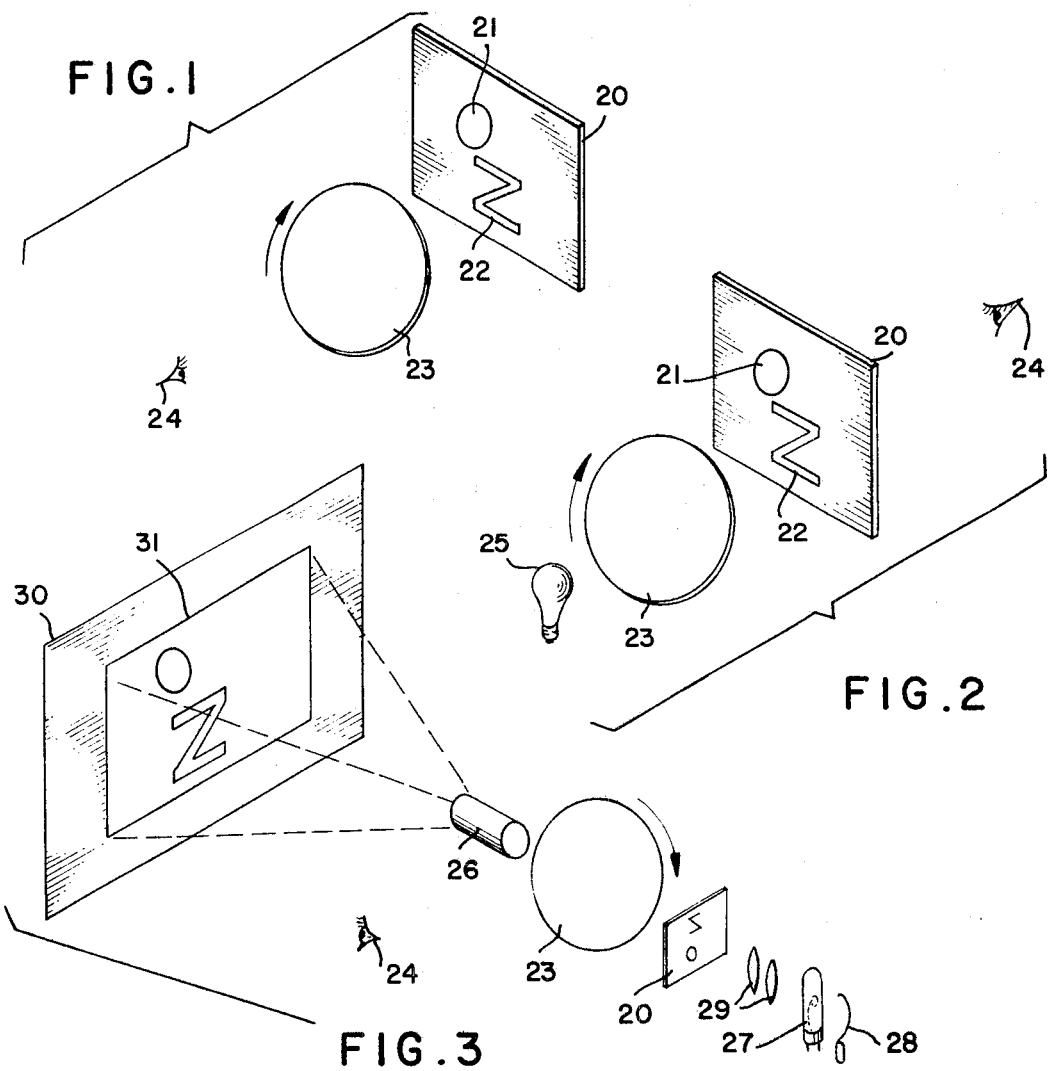
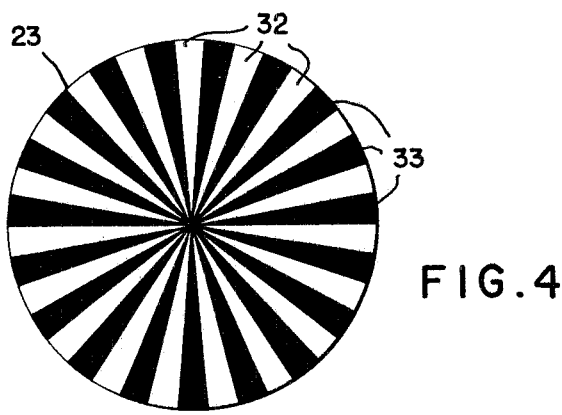
FIG.4
INVENTOR.
DONALD N. YATES
BY
ATTORNEY April 14, 1970   D. N. YATES   3,505,750
APPARATUS FOR CREATING APPEARANCE OF OBJECTS IN MOTION
Filed Aug. 28, 1967   5 Sheets-Sheet 2
FIG.5
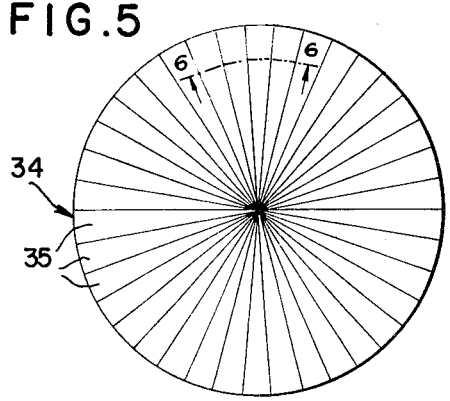
FIG.6
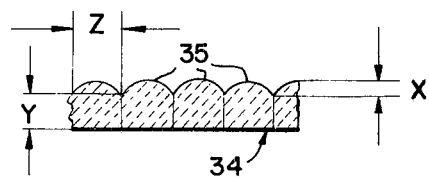
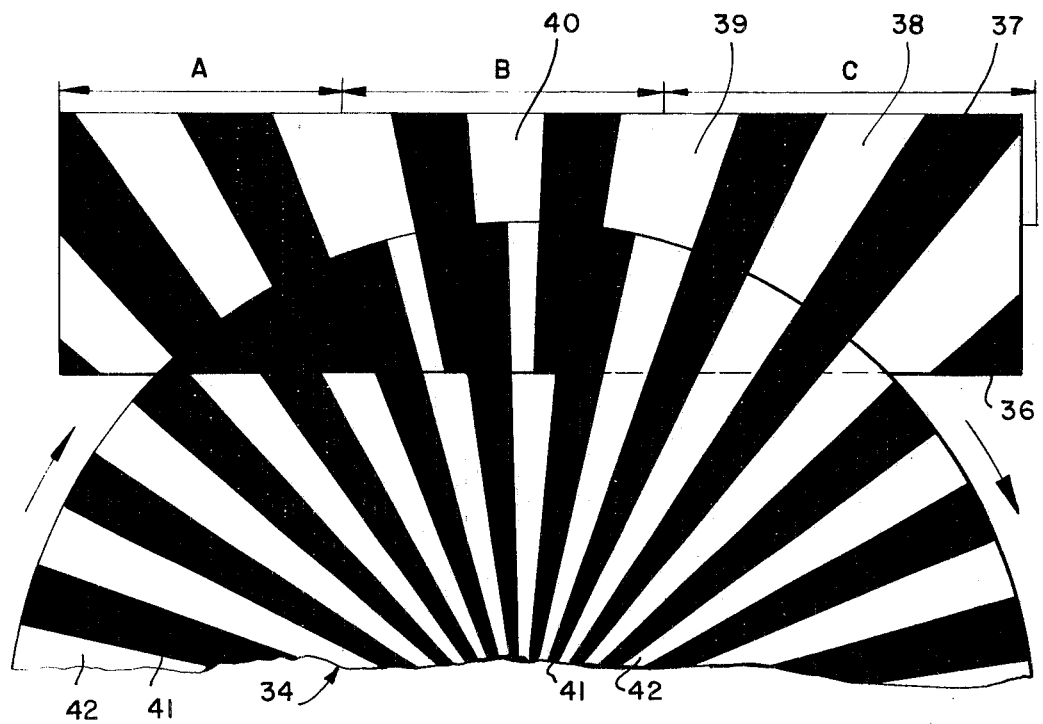
FIG.7
INVENTOR.
DONALD N. YATES
BY
ATTORNEY

INVENTOR.
DONALD N. YATES

BY

ATTORNEY

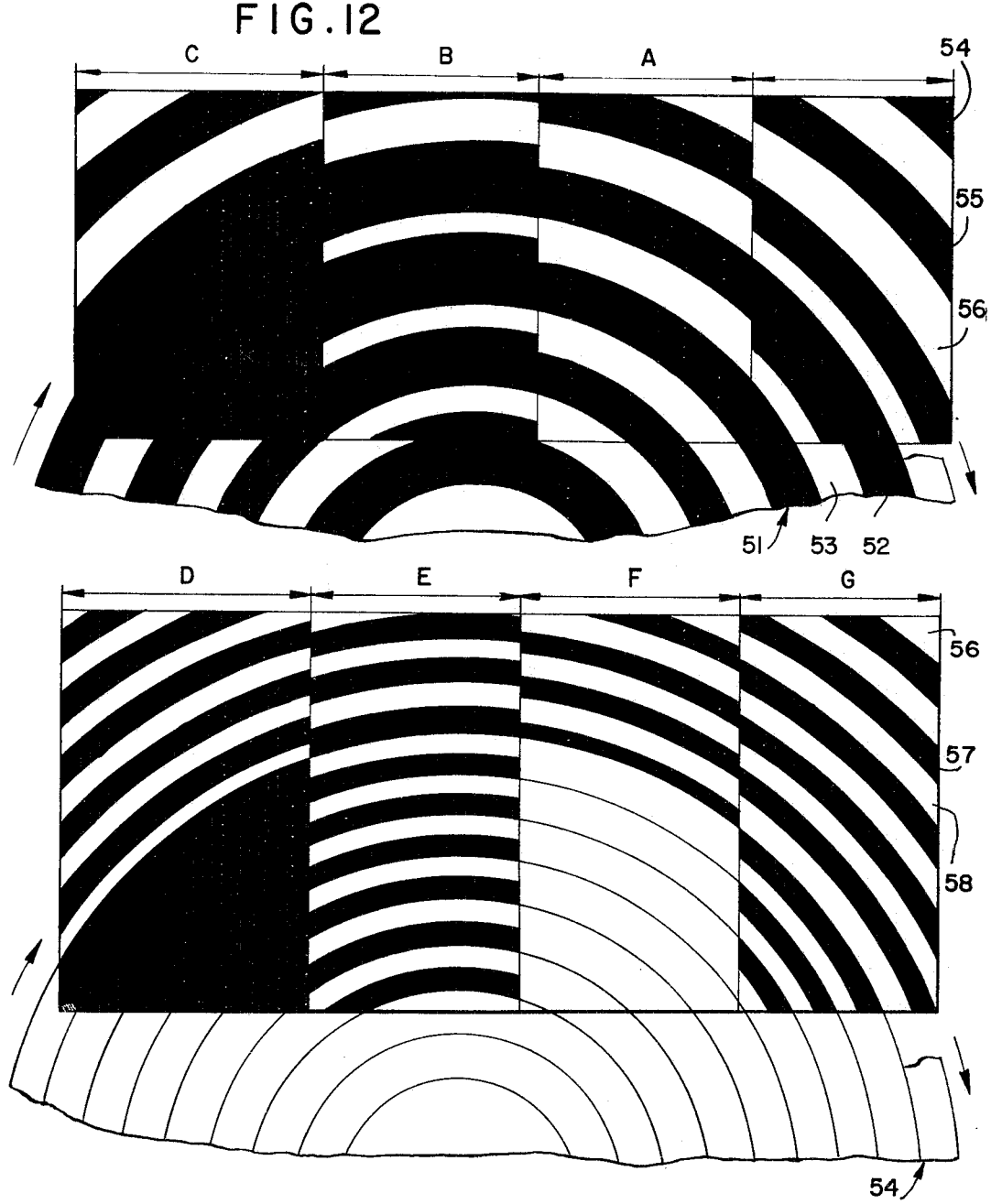

April 14, 1970  D. N. YATES  3,505,750
APPARATUS FOR CREATING APPEARANCE OF OBJECTS IN MOTION
Filed Aug. 28, 1967  5 Sheets-Sheet 5

INVENTOR.
DONALD N. YATES
BY
ATTORNEY

United States Patent Office 3,505,750
Patented Apr. 14, 1970

3,505,750
APPARATUS FOR CREATING APPEARANCE OF
OBJECTS IN MOTION
Donald N. Yates, 710 Rockwood Drive,
Gibsonia, Pa. 15044
Filed Aug. 28, 1967, Ser. No. 663,832
Int. Cl. G09f 13/34
U.S. Cl. 40—106.53                                    11 Claims

ABSTRACT OF THE DISCLOSURE

A variety of motion effects are obtained by providing a screen of alternate light and dark areas arranged as the radial or spiral spokes of a wheel and rotating this grid over a stationary artwork grid made up of differently formed alternate light and dark areas.

---

FIG. 1 in the accompanying drawings illustrating present embodiments of the invention is a diagrammatic view of a front viewing type of animation, representing by an eye the viewing of the animated plate from the front and lighting on the plate being ambient.

FIG. 2 is a diagrammatic view of a back lighted form of the invention with a light source in front of the animating disk and the animated plate viewed from the back.

FIG. 3 is a diagrammatic view illustrating a projected form of the animation.

FIG. 4 is a plan of the spoke type of disk grid employed.

FIG. 5 is a plan of an optical form of spoke disk.

FIG. 6 is an enlarged cross sectional detail as on line 6—6 of FIG. 5.

FIG. 7 is a broken diagrammatic view illustrating the conjunctive cooperation of the disk grid with the live art, such as represented in the first three figures.

FIG. 12 is a broken detail illustrating the effect of the spiral disk in conjunction with the spiral artwork.

FIG. 13 is a similar view of the spiral optical disk in conjunction with the spiral artwork.

Figure 8:
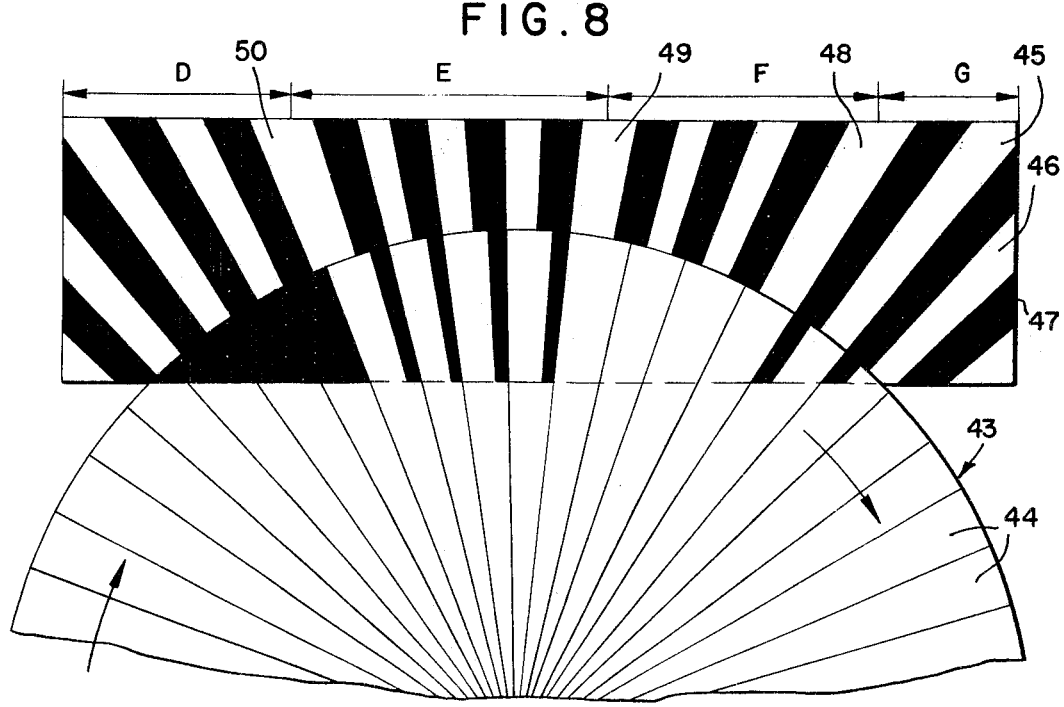
FIG. 8 is a similar view representing the spoke lens, optical type disk in relation to the lined grid art.

The present invention differs from the previous forms of animation; such as represented, for example, by Patent No. 3,235,987, of Feb. 22, 1966, in that the motion effect is obtained by rotating a moving grid over stationary artwork instead of travelling a grid linearly in the form of a belt or plate.

This rotary grid of the present invention is of spiral or spokelike design made up of radially extending alternate light and dark areas; composed of lines or lenticular lenses.

The pattern underneath this moving grid is made up of spaced lines that coincide or line up with the spokes or spiral pattern to produce the appearance of objects or materials in motion in accordance with the design of the artwork.

In FIG. 1, the artwork is represented at 20 with the static art 21 and animated art 22, directly in front of or behind the animating disk 23 in relation to the eye of the observer at 24.

It is generally preferred to have the disk in contact with or very close to the animated plate.

FIG. 2 illustrates the layout of the art plate 20 with a light source 25 in front of the disk, for observation in back of the plate; this type unit particularly designed for point of purchase displays, where many copies are required.

This may be brought up to billboard size and in most cases the rotating grid will be close to the line grid art on the stationary panel which may carry both static art and copy.

In some cases the animation may be cut out of the static art panel, with transparent and opaque grids adhered to the cutout sections so that with the rotating disk only the areas that are cut out will be in motion with no adverse effects from the disk travelling over the stationary opaque art.

This is achieved in the back lighted type of unit.

In FIG. 3, a schematic layout of projecting rotary animation is shown with the rotating animating disk 23 between lens 26 and animated artwork 20, in conjunction with light source 27, reflector 28, with the condenser system 29 and projection on screen 30.

The projected image 31 will have animation in the desired area as designed.

This type of arrangement is for the simple forms of animated slides, where the backgrounds would be opaque, or dark, or at least very plain so that the rotating disk would not affect areas not to be animated.

FIG. 4 shows in detail how the spokelike grid disk 23 is made up with alternately arranged light and dark areas 32 and 33, tapering to a fine point at the center of the disk.

In most cases the angle of the clear wedge and dark wedge areas may be equal; radiating out from the center of the disk.

These animating disks may be producted photographically, silk screening or printing; the black areas on a glass, plastic or film type of material. Generally the dark areas may be opaque.

FIGS. 5 and 6 illustrate another form of spoke disk 34 in which the tapering wedge form of clear optical lenses 35 radiate outward from the center of the disk.

These disks may be made of clear plastic; molded by conventional means.

In the cross sectional view, FIG. 6, the optical lenses 35 are shown as having a thickness or depth X on a plate thickness Y and a width Z.

This relation is critical in most cases and should generally follow the proportions X equals Y equals Z. Other ratios may be used for various effects, within the scope of the invention.

FIG. 7 shows the stationary artwork grid 36 with radiating tapered black areas 37, and similar clear areas 38, 39 and 40, with areas 38 and 40 equal to 37 and area 39 slightly larger.

The areas 38 and 40 are located between the various elements of motion indicated at A, B and C.

If areas 39 are made less than the clear areas 38 and 40, the apparent motion will reverse in direction.

The rotating spoke wheel is made up of relatively dark and clear areas, similar to the relatively dark and light areas on the stationary art 36, composed of the black and white areas 37 and 38.

In the illustration, the black and white areas 41 and 42 of the disk are superimposed on the black and white areas of the stationary artwork grid in section C while in section B they are offset from each other, while in section A the black areas of the rotating disk are in the white areas of the stationary art grid. This represents the basic operation of this rotary animation, where the rotating disk grids line up with stationary grids, blacking out groups sequentially to create appearance of motion at the stationary grid artwork.

FIG. 8 illustrates an optical spoke disk 43 with wedge lenses 44 superimposed on stationary artwork 45, made up of grids of light and dark areas 46 and 47, with larger areas 48, 49 and 50 in indicated sections D, E, F, G.

The action is the same as described in FIG. 7.

If the intervening spaces between the several groups are made smaller than the clear spaces 46, the motion will reverse.

The lens part of the disk covering section D magnifies the black lines to appear completely dark in that area, whereas the lenses in section E simply shows small black lines.

In section F, the magnification of the lenses only magnifies the clear areas so that this whole segment is clear, with segment G similar to segment E.

As the disk rotates as indicated, the segments D, E, F and G will appear dark, light dark, then clear, light dark and dark again; this creating appearance of motion.

Figure 9:
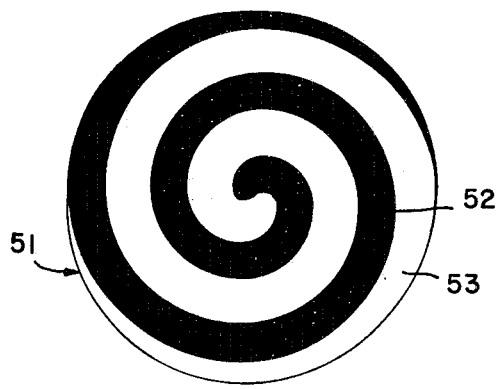
FIG. 9 is a plan view of a spiral form of spokelike grid.

FIG. 9 shows a disk 51 made of a dark spiral 52, with clear spiral area 53. These contrasting spiral areas may be opaque and transparent, respectively.

Figure 10:
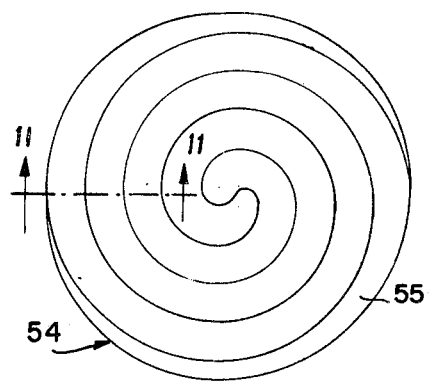
FIG. 10 is a plan view of an optical form of spiral disk.

FIG. 10 illustrates an optical form of spiral disk 54 with a spiraled lens 55.

Figure 11:
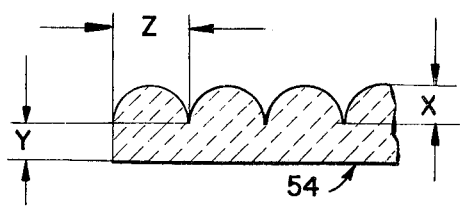
FIG. 11 is an enlarged broken cross sectional detail on substantially the plane of line 11—11 of FIG. 10 showing the spiral lens.

FIG. 11 illustrates the cross section of the spiral lens disk, with thickness or depth of the lens represented at X, thickness of the plate Y and the width of lens Z, and in which the ratio X equals Y equals Z may be usually followed.

FIG. 12 illustrates the combination of the spiral disk 51, FIG. 9, having dark and light spiral areas 52, 53, rotating in respect to the static artwork grid 54, having dark and light spiral areas, 55, 56 producing the effective sections A, B and C, wherein the spiral dark areas on the disk are out of register with the artwork spiral in section C, so that area is completely dark, whereas in the B section, the spirals are slightly out of line and that area partially dark and in section A the dark areas in disk and stationary art are in line, with this section appearing to be clear.

As the disk turns, the lighting effect will appear to be moving radially outward or inward, depending on the direction of rotation with the black elements appearing to move across the stationary art.

In FIG. 13, the spiral optical disk 54 of FIG. 10 with the spiral lens 55, is superimposed over stationary art grid 56 having dark spiral areas 57 and light areas 58, slightly askew, producing segments D, E, F and G, lining up to produce by magnification the dark effect in segment D and the partially dark effect in segments E and G and the clear spaces in segment F.

As the disk rotates, a spiral appears to be moving radially outward or inward, with a spreading or collapsing radial effect, depending on the direction of rotation; the segments D, E, F and G becoming dark one after the other, creating the illusion of motion.

Figure 14:
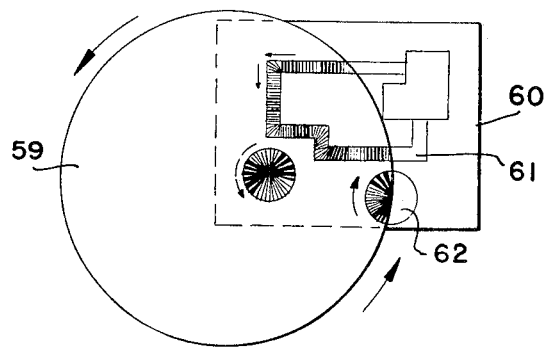
FIG. 14 is a diagrammatic view of a sample piece of art in conjunction with the overlaying animating disk.

FIG. 14 illustrates a combination of rotating animating disk 59 having the radially extending light control segments, such as shown in FIGS. 4, 5, 9 and 10, rotating over a sample piece of artwork 60 prepared with various grid art 61 in linear motion and 62 for rotary motion.

At the disk operates, various dark elements in the clear portions of the plate will appear to move with linear motions and rotary motions in the same, or opposite directions as laid out on the artwork and according to direction of rotation of the animating disk and the speed of rotation directly proportional to the apparent motion.

Figure 15:
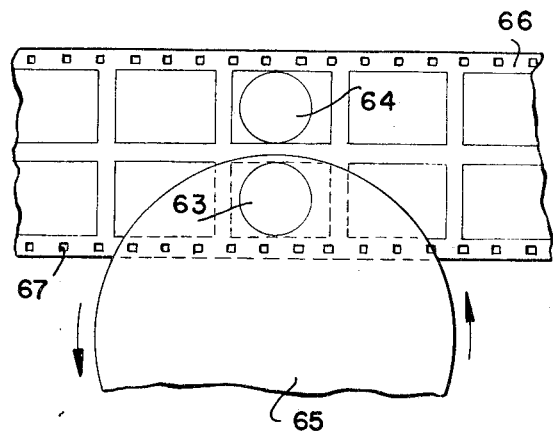
FIG. 15 is a broken diagrammatic view showing a projection type of animation producing two images; one a static picture and the other an animated picture.

FIG. 15 illustrates another system where a stereo film is utilized and embodying lenses 63 and 64 with a disk 65 for projecting animation.

In this, the film strip 66 can be shifted by perforations 67, or other conventional means for moving film.

This arrangement could also be single stereo type slides having two frames per slide for stereto projection.

Figure 16:
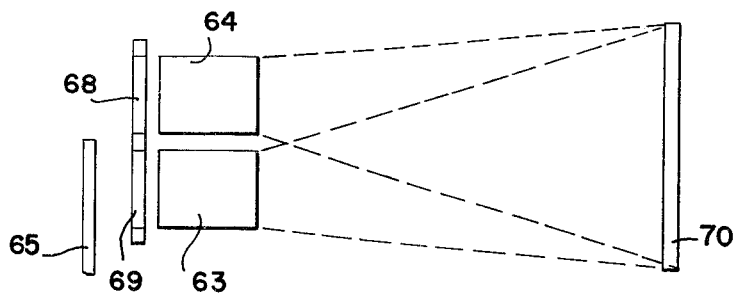
FIG. 16 is a layout of the dual superimposed projection system of FIG. 15.

In FIG. 16, a dual or stereo projection system is shown with lenses 63 and 64 for projecting two separate pictures 68, 69, superimposed on screen 70.

The disk is shown as concerned with only one film at 63.

In most cases the artwork will be static at 63 and having its animated area blocked out so they will project black on the screen. Conversely, the only areas to be projected on the animated side of the film and projected through lens 63 will have its background opaqued out.

Thus there will be two separate pictures projected to produce one picture, so with use of the disk in motion, there will be apparent motion of many selected types.

The dual projection eliminates the limitation of background art.

This type of projection animation using the rotating disk grid can be utilized not only in high production runs and copies, but may also be effectively and economically produced in short runs.

The special equipment needed to produce this type of animation is not complicated or expensive to set up.

The rotary disk grids can be produced at low cost. The drive motor mechanism can be very simple, as by use of a low r.p.m. gear motor.

In all forms of the invention illustrated, the illusion of motion is created by shifting shadows generated by rotation of an imating grid of spoke-like light and dark areas, over a stationary artwork grid made up of light and dark areas differently spaced from the areas of the disk.

The radiating spokelike areas of the disk may be on straight lines, as in FIGS. 4, 5, 7, 8, or curved as in spiral form, FIGS. 9, 10, 12, 13, and may be provided by alternate contrasting clear and dark or opaque spaces, FIGS. 4, 5, 7, 8, or by radial or spiral lenses, FIGS. 5 and 10.

The stationary artform grids are shown as made up of radially arranged alternate light and dark areas as in FIGS. 7 and 8, or spirally extending light and dark areas, FIGS. 12 and 13 or linearly extending areas, FIG. 14, differently spaced from the dark areas, as by differences in width or spacing of the areas, as in FIGS. 7 and 8.

The companion grids can be inexpensively produced by conventional methods and many different effects, including opposite directions of movement, FIG. 14, can be produced by simple rotary movement of a single disk form of grid.

The straight and curved lenticular disks, FIGS. 5 and 10, have a magnifying effect, enlarging and accentuating the contrasting light and dark areas, FIGS. 7 and 8.

The invention provides for front or back viewing and ambient or direct lighting and projection, FIGS. 1, 2 and 3.

What is claimed is:

1. Apparatus for creating the appearance of objects or materials in motion, comprising the combination of
   a stationary artwork grid made up of definitely outlined spaced light and dark areas, and
   an animating grid in the form of a disk rotating over said artwork grid and made up of spirally radiating areas extending between the center and the rim of the disk,
   said light and dark areas of the artwork grid made up of lines and spaces of equal width arranged in successively disposed groups of equally spaced lines and spaces, with
   adjoining groups separated by spaces of different width from the lines and spaces in said groups, and
   said disk groups made of of lines and spaces of equal width and equal to the width of the lines and spaces in said groups of the art work grid.

2. The invention according to claim 1 in which said areas of the nartwork grid are lined in cooperation with the disk to effect appearance of motion in opposite direction from rotation of the disk in one direction.

3. The invention according to claim 1 in which said spirally radiating areas of the grid disk are curvilinear in extent.

4. The invention according to claim 1 in which said spirally radiating areas of the grid disk consist of magnifying lenses extending spirally between the center and the rim of the disk.

5. The invention according to claim 1 in which said areas of artwork and disk grid are of two different spiral formations.

6. Apparatus for creating the appearance of objects or materials in motion, comprising the combination of
   a stationary artwork grid made of of definitely outlined spaced light and dark areas, and
   an animating grid in the form of a disk rotating over said artwor kgrid and made up of spokelike areas of magnifying leases and offset in respect to the spacing of corresponding underlying areas of the artwork grid,
   said light and dark areas of the artwork grid made up of lines and spaces of equal width arranged in successively disposed groups of equally spaced lines and spaces, with
   adjoining groups separated by spaces of different width from the lines and spaces in said groups, and
   said disk groups made up of lines and spaces of equal width and equal to the width of the lines and spaces in said groups of the artwork grid.

7. The invention according to claim 6 in which said spokelike radiating areas of the grid disk are substantially straight.

8. The invention according to claim 6 in which said spokelike radiating areas of the grid disk consist of wedge shape sections tapering to the center of the disk.

9. The invention according to claim 6 in which said spokelike radiating areas of the grid disk consist of magnifying lenses extending straight from the center to the rim of the disk.

10. The invention according to claim 6 in which said spokelike radiating areas of the grid disk consist of magnifying lenses on a platelike support and in which the thickness of the lenses, width of the lenses and thickness of the support are substantially equal.

11. The invention according to claim 6 in which said areas of the artwork grid are lined in cooperation with the disk to effect appearance of motion in opposite direction from rotation of the disk in one direction.

References Cited

UNITED STATES PATENTS

| 2,058,581 | 10/1936 | Fegan. | |
| 2,365,547 | 12/1944 | Hausherr | 40—34 X |
| 2,566,124 | 8/1951 | Eaves | 40—34 X |
| 3,225,457 | 12/1965 | Schure | 40—137 X |
| 3,235,987 | 2/1966 | Yates | 40—106.51 |
| 3,313,041 | 4/1967 | Weigang | 35—13 |
| 3,366,006 | 1/1968 | Saila | 40—106.51 X |

EUGENE R. CAPOZIO, Primary Examiner

R. CARTER, Assistant Examiner